United States Patent
Card et al.

[11] Patent Number: 5,804,802
[45] Date of Patent: *Sep. 8, 1998

[54] TWO-WAY DATA COMMUNICATION MANAGER

[75] Inventors: Jennifer M. Card, Watertown; Kenneth M. Liberatore, Bethel, both of Conn.

[73] Assignee: United Parcel Service of America, Inc., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 601,366

[22] Filed: Feb. 14, 1996

[51] Int. Cl.$^6$ .................................................. G06F 15/20
[52] U.S. Cl. .................................. 235/375; 235/472
[58] Field of Search ...................... 235/472, 375

[56] References Cited

U.S. PATENT DOCUMENTS

| | | | |
|---|---|---|---|
| 4,630,216 | 12/1986 | Tyler et al. ............................. | 235/275 |
| 4,711,994 | 12/1987 | Greenberg . | |
| 4,832,204 | 5/1989 | Handy et al. . | |
| 4,857,713 | 8/1989 | Brown . | |
| 4,866,257 | 9/1989 | Elliott et al. ............................ | 235/375 |
| 4,896,029 | 1/1990 | Chandler et al. . | |
| 4,974,166 | 11/1990 | Maney et al. ........................... | 235/375 |
| 5,029,183 | 7/1991 | Tymes ....................................... | 375/1 |
| 5,043,908 | 8/1991 | Manduley et al. ...................... | 235/375 |
| 5,103,461 | 4/1992 | Tymes ....................................... | 375/1 |
| 5,128,520 | 7/1992 | Rando et al. . | |
| 5,142,128 | 8/1992 | Perkin et al. ............................ | 235/375 |
| 5,142,550 | 8/1992 | Tymes ....................................... | 375/1 |
| 5,157,687 | 10/1992 | Tymes ....................................... | 375/1 |
| 5,225,990 | 7/1993 | Bunce et al. . | |
| 5,272,324 | 12/1993 | Blevins . | |
| 5,280,498 | 1/1994 | Tymes et al. ............................ | 375/1 |
| 5,291,001 | 3/1994 | Krayer et al. ........................... | 235/375 |
| 5,313,052 | 5/1994 | Watanabe et al. . | |
| 5,343,028 | 8/1994 | Figarella et al. . | |
| 5,352,878 | 10/1994 | Smith et al. . | |
| 5,479,441 | 12/1995 | Tymes et al. ............................ | 375/200 |
| 5,528,621 | 6/1996 | Helman et al. ......................... | 375/200 |

*Primary Examiner*—Harold Pitts
*Attorney, Agent, or Firm*—Jones & Askew, LLP

[57] ABSTRACT

A data communication manager provides a versatile interface between different types of scanners and a central computer system. Each data manager periodically receives loading data from the host computer. A scanner is used to read package tracking numbers on packages at a predetermined point in a hub facility. The data is transmitted from the scanner to the data manager via radio frequency (RF) link. The data manager uses stored disposition data (received from the host earlier) to determine whether the package should be loaded and transmits the appropriate signal to the load/no-load indicator via another RF link. The data manager stores data indicative of the disposition of the package data in its memory and also forwards the data to the host computer, where it may be used for tracking purposes. The data communication manager provides a "smart" data manager that reduces the amount of traffic on the host computer's network and provides sub-second response times to a loader. The application programs and data in the data managers may be updated by the host as needed.

33 Claims, 7 Drawing Sheets

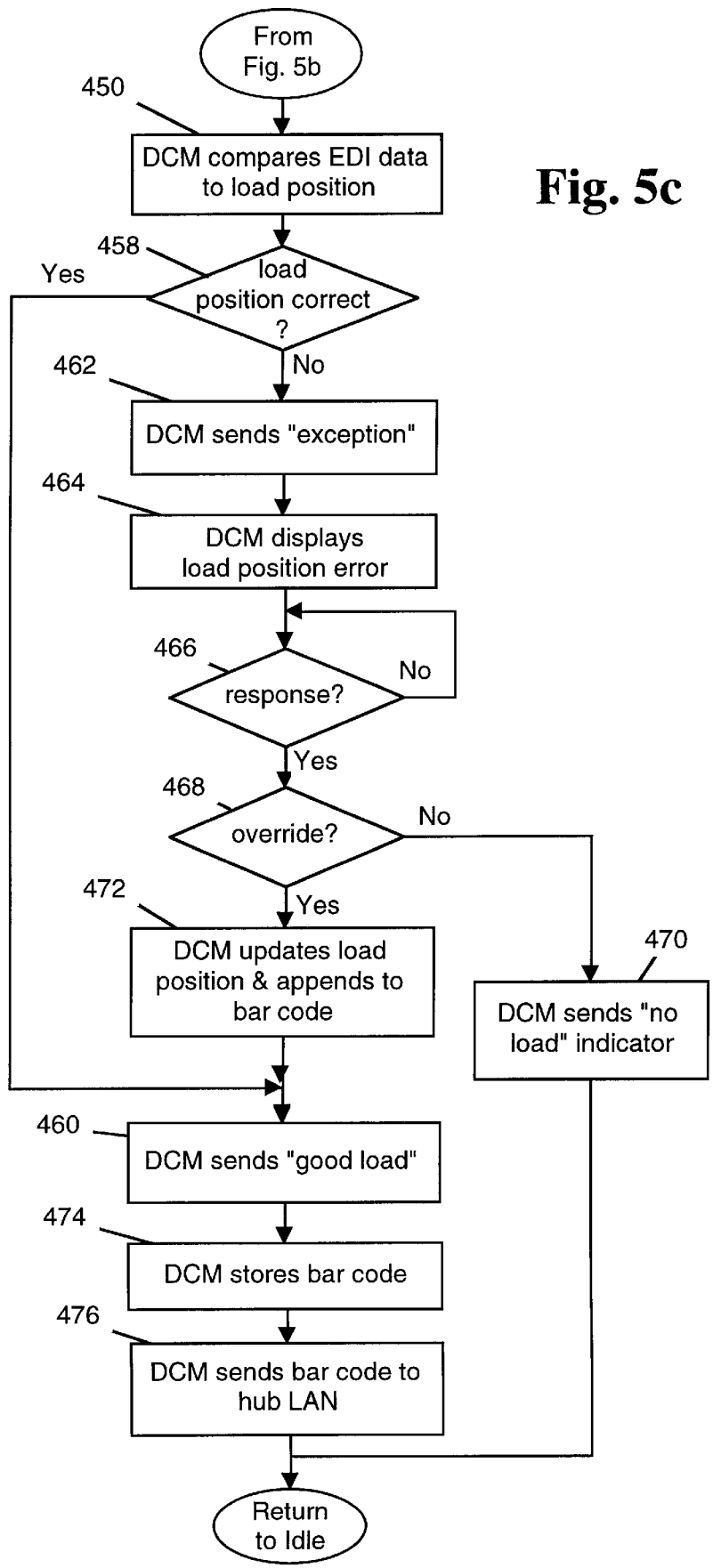

TWO-WAY DATA COMMUNICATION MANAGER

TECHNICAL FIELD

The present invention relates to systems and methods for processing data, and more particularly relates to systems and methods for determining the disposition of packages in a shipping terminal.

BACKGROUND OF THE INVENTION

Machine-readable codes such as bar codes are used to identify and track many types of items in a variety of contexts. These machine-readable codes are read by appropriate electronic code readers such as bar code readers. Machine-readable codes and electronic code readers are useful because they facilitate the electronic collection of the data embodied in the machine-readable codes and allow the data to be collected more quickly and more accurately than is possible with manual data entry. Once a machine-readable code is read by the code reader, it may be used for a variety of purposes, including updating inventory, tracking the item bearing the code, and looking up information associated with the code.

In many applications, several electronic code readers are connected to a single host computer. For example, in a grocery or department store each cashier will have a code reader that is connected to the store's host computer. In most cases, each item sold by the store is identified by a label or tag bearing a bar code, and a cashier will use a bar code reader to read the bar code when customer checks out. For each item, the data from the bar code scanner is used to access associated data stored in a database stored on the host computer. The database may include information pertaining to the item, such as price, product description, manufacturer, etc. When the item is read, an audible or visible indicator may be provided to indicate to the cashier that the code has been read successfully and that the associated data is available. The description and price data is used by the cashier's electronic cash register to indicate the price of the item and to prepare a receipt. The store's computer may also use the data to update its inventory records.

Machine-readable codes are also useful in warehouses. The bar codes affixed to items may be scanned as items are placed into or removed from their respective bins. The data may be forwarded to a central computer where it is used to update the inventory and to match the item to a sales order. A system may provide feedback to a user to indicate that the code has been read and the right item selected.

Machine-readable codes are also used in the airline industry to track and identify luggage that is loaded into the places cargo hold. Such a baggage checking system may use flight numbers, traveler identification data and baggage tag numbers from check in and transfer desks and collates it with baggage tag numbers read at baggage loading points. A luggage loader scans a bar code on each piece of luggage before it is loaded into the plane. The data is forwarded to a host computer and checked against other available data. If an attempt is made to load a bag on an incorrect flight an alarm is given at the loading point to indicate that a piece of luggage should not be loaded into the aircraft.

In the package delivery industry, companies such as the assignee of the present invention typically apply a label bearing a machine-readable code to each package in the system. The label bears a tracking number that uniquely identifies the package, and the associated data (stored in a host computer) may include information such as the size and weight of the package, the origin and destination address, and type of service selected (e.g., overnight delivery, second day delivery, etc.) This data may be used to sort and track packages as they move throughout the package distribution system.

From the foregoing examples, it is apparent that several electronic code readers may be simultaneously connected to a single host computer. For example, in a grocery or department store, there will be many electronic cash registers that retrieve pricing and other data from the store's host computer. Similarly, an airline may have tens or hundreds of personnel loading baggage into airplanes. In the system described above, each of these employees would be scanning bar codes on luggage and relying on a central host computer for an indication as to whether each piece of luggage should be loaded into a plane. In a package delivery company, a terminal facility may provide tens or hundreds of loading docks where employees scan packages as they are loaded into trucks. The employee at each loading dock relies on the central host computer to provide a signal that indicates whether the package is to be loaded into a particular truck.

The number of electronic code readers that may be connected to a single host computer is determined by a number of factors, including the response time required, the speed or capacity of the host computer, the capacity of the network that connects the code readers to the host computer, etc. Too much traffic from too many code readers places too much of a load on the host computer and the network and slows down the responses received by the user. Furthermore, in the event the host computer or network fails, the attached code readers will be rendered inoperative.

In order to increase the capacity of a code reading system and maintain a fast response time, the operator is required to add expensive host computer equipment and network facilities. Furthermore, in order to add different types of code readers to the system, the operator must provide a variety of interface units compatible with the various code readers.

Therefore, there is a need in the art for an efficient system and method for connecting a large number of scanners to a host computer and central database and for allowing the scanners to continue to operate in the event of a network failure. The solution should provide an alternative to simply upgrading the host computer and network facilities.

Summary of the Invention

The present invention satisfies the above-described need by providing a system and method for efficiently processing and responding to data from a plurality of input devices. The invention employs a plurality of intelligent data managers that are connected to a host computer. Each data manager is also connected to an input and output device associated with one of a plurality of work positions. Periodically, the data managers receive and store information from the host computer. Each data manager then uses the stored information to respond to the data from the associated input device. The data managers also provide data to the host computer. By storing and forwarding the data, the data managers provide a redundant system that can continue to operate in this fashion if the connection to the host computer is interrupted. By processing the data at the data managers, the system provides quick responses to each work position and reduces the amount of data traffic between the input and output devices at each work position and the host computer.

Generally described, the present invention provides an improvement for use in a system for sorting a plurality of objects and conveying each of the sorted objects to a predetermined position. The improvement includes a label reader for providing identification data corresponding to a machine readable code on an object and a host computer for providing disposition data pertaining to the object. The improvement also includes a data communication manager for receiving the identification data from the code reader and the disposition data from the host computer. The data communication manager is operative to determine the disposition of the object on the basis of the stored disposition data and to provide a disposition signal in response to the determination. The system also includes an indicator for receiving the disposition signal and providing to a user an indication corresponding to the disposition signal.

In another aspect, the improvement of the present invention provides a host computer comprising disposition data associated with at least one of a plurality of objects, which have been sorted and conveyed to a predetermined position. The present invention provides a plurality of data communication managers operatively connected to the host computer. A data communication manager is associated with each of the positions. A plurality of input devices are provided for reading object identification data from the sorted objects. An input device is operatively connected to each of the data communication managers. The host computer is operative to transfer the disposition data to the data communication managers. Each input device reads the object identification data from a sorted object and transmits the object identification data to the connected data communication manager. The data communication manager store the disposition data received from the host computer. The disposition of the sorted object is determined based on the stored disposition data and the object identification data. The data communication manager then stores data indicative of the disposition of the sorted object and transmits that data to the host computer.

More particularly described, the connection between the host computer and the data communication managers allows disposition data to be transferred from the host computer to the data communication managers at predetermined times and when updated disposition information is available at the host computer. The determination regarding the disposition of the sorted object includes determining whether the sorted object was conveyed to the proper position. This is accomplished by determining whether an object parameter associated with the sorted object corresponds to a position parameter associated with the position. Alternately, the determination regarding the disposition of the sorted object includes determining whether the disposition data comprises a revised disposition record associated with the sorted object.

In another aspect, the present invention provides a method of processing data in a data processing system that includes a label reader for reading labels associated with a plurality of objects, a data communication manager, a host computer, and an indicator. In the present invention, disposition data from the host computer is transferred to the data communication manager. When a label associated with one of the plurality of objects is read, object identification data corresponding to the label is provided to the data communication manager. The data communication manager then determines the disposition of the object on the basis of the disposition data. Once the disposition of the item is determined by the data communication manager, the data communication manager provides at the indicator a signal indicative of the disposition of the item.

More particularly described, the method of the present invention transfers disposition data from the host computer to the data communication manager at a predetermined time and when updated disposition data is available. In the method of the present invention, determining the disposition of the object comprises determining whether the disposition data indicates that an object parameter has been altered. In another aspect, determining the disposition of the object comprises determining whether an object parameter associated with the object identification data corresponds to a predetermined range of parameters associated with the data communication manager.

In yet another aspect, the present invention provides a method for operating a data communication manager. The data communication manager receives package information, which indicates the disposition of a plurality of items, from a host computer. The data communication manager also receives package identification data from an input device. The package identification data is associated with a first item of the plurality of items. At that point, the data communication manager determines the disposition of the first item on the basis of the package information and provides an indication of the disposition of the first item.

Therefore, it is an object of the present invention to provide an interface for connecting a plurality of input/output devices to a network while maintaining rapid data throughput at each of the input/output devices.

It is another object of the present invention to provide a communication manager that is capable of continuing to process data in spite of the loss of its connection to a network.

It is another object of the present invention to network interface that provides redundant real time data store and forward functionality.

It is another object of the present invention to provide a flexible interface for connecting a variety of input/output devices to a network.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
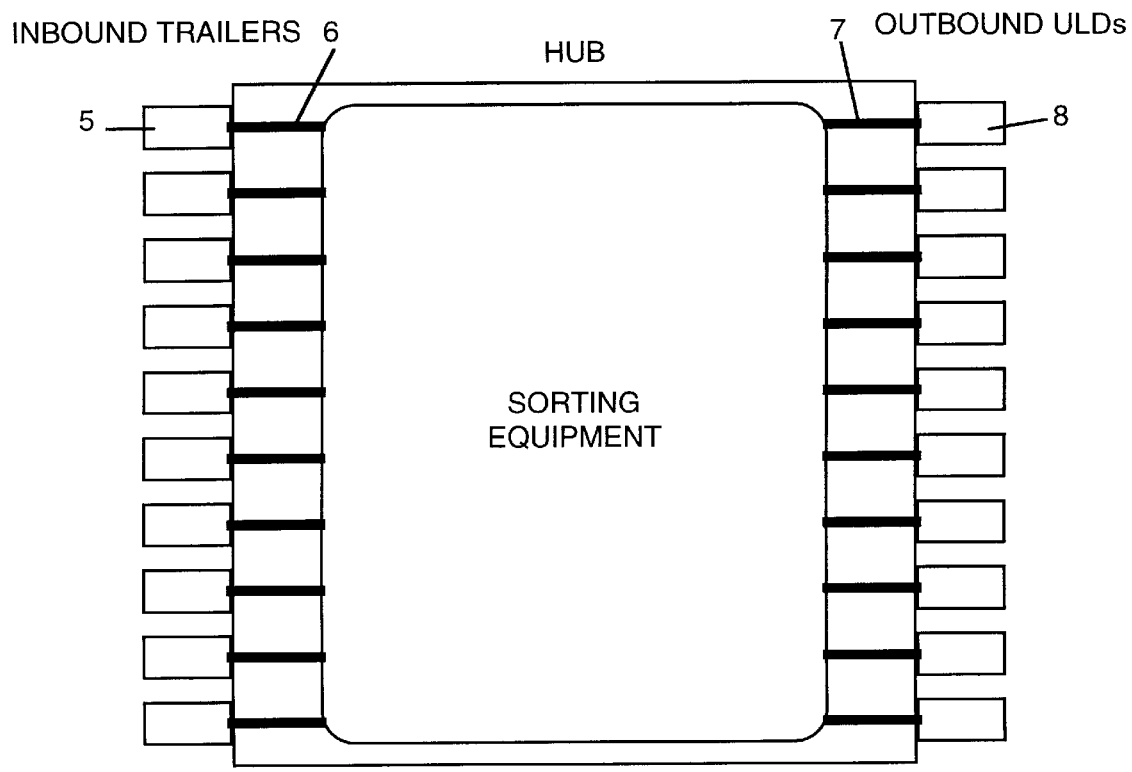
FIG. 1 is a diagrammatic representation of a hub or sorting facility that employs the preferred embodiment of the present invention.

The present invention provides a novel system and method for processing data from a plurality of work positions in conjunction with data provided by a host computer. Generally described, the preferred embodiment of the present invention interfaces a host computer at a package sorting facility to a plurality of input and output devices located at each load position. In the preferred embodiment, a two-way data communication manager is associated with each load position. Each data communication manager receives package related data from the host computer. As sorted packages are conveyed to each load position, each package is scanned by an input device and packaging identifying data such as a tracking number is transmitted to the associated data communication manager. The data communication manager compares the package identifying data to its stored data in order to determine the disposition of the package. The data communication manager provides a signal at the load position to indicate to the loader that the package should be loaded or that some other action is required. Data regarding the packages movement is stored in the data communication and forwarded to the host computer. By processing the package data at the data communication manager, the preferred system provides rapid responses to the work positions and is capable of continuing to operate even if the connection to the host computer is interrupted.

Before describing the present invention in additional detail, it is useful to discuss the terminology used in the specification. Portions of the detailed description that follows are represented largely in terms of processes and symbolic representations of operations performed by computer components, including a central processing unit (CPU) and memory storage devices for the CPU. These operations include the manipulation of data by the CPU and the maintenance of these data within data structures resident in one or more of the memory storage devices. The symbolic representations are the means used by those skilled in the art of computer programming and computer construction to most effectively convey teachings and discoveries to others skilled in the art.

For the purposes of this discussion, a process or portions thereof may be generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. In most cases, it will be apparent that these steps are performed by a computer without requiring input from an operator. The machines used for performing the operation of the present invention include general purpose digital computers or other similar computing devices.

In addition, it should be understood that no particular programming language is provided, and that the programs, processes, methods, etc. described herein are not limited to any particular computer or apparatus. Those skilled in the art will appreciate that there are many computers and operating systems which may be used in practicing the instant invention and therefore no detailed computer program could be provided which would be applicable to these many different systems. Each user of a particular computer or operating system will be aware of the program modules and tools that are most appropriate for that user's needs and purposes.

Referring now the drawings, in which like numerals represent like elements throughout the several figures, the preferred operating environment and the preferred embodiment of the present invention will be described.

THE PREFERRED OPERATING ENVIRONMENT

The preferred embodiment of the present invention is designed for use in a package delivery company's central sorting facilities, which are also known as hubs. Before describing the details of the preferred embodiment of the present invention, it is helpful to describe the operation of a hub facility, such as those operated by the assignee of the present invention.

FIG. 1 is a diagrammatic representation of a hub. To transport packages most efficiently, the assignee of the present invention has developed an elaborate network of "hubs" or central sorting facilities located throughout the world. Each hub is "fed" by a number of local operating centers, which serve as home base for the pick-up and delivery vehicles. Each day, packages from the local operating centers are delivered to the closest hub, usually by tractor trailer. Each shift at a hub is referred to as a "sort." During each sort, packages are unloaded from numerous inbound trailers 5 and placed on conveyor belts 6. In one huge, fast-paced operation, the packages are automatically sorted by ZIP code and consolidated on conveyor belts. Packages bound for a specific geographical region are all consolidated on the same conveyor belt. At the other end of the hub, packages undergo a finer sort and are routed to a specific load position, which is associated with a specific destination. At each load position is a conveyor belt 7 and an out-bound unit load device (ULD) 8, such as a tractor trailer or aircraft cargo container. Before a loader loads a package into an outbound ULD, each package is checked one last time in order to ensure that it has been sorted correctly and conveyed to the proper load position.

Sophisticated data processing has become an indispensable part of modern package delivery companies. Among other things, data processing is used to track packages as they move through a delivery company's facilities. In most cases, each package receives a label that includes object identification data, such as a tracking number. This package identification may be provided in the form of a machine readable code, such as a bar code or two-dimensional dense code. Examples of bar codes, two-dimensional dense codes, and techniques for processing these codes are provided in U.S. Pat. Nos. 5,343,028, entitled "Method and Apparatus for Detecting and Decoding Bar Code Symbols Using Two-Dimensional Digital Pixel Images," 5,352,878, entitled "Method and Apparatus for Decoding Bar Code Symbols Using Independent Bar and Space Analysis," and 4,896,029, entitled "Polygonal Information Encoding Article, Process and System," all of which are assigned to the assignee of the present invention and incorporated herein by reference.

As the package passes certain points in the system, the label is scanned and the tracking number recorded. This allows the package delivery company to provide its customer with up to date information on the location of a package. In addition, the tracking number is used as an index into data files that contain other data associated with a package, such as the identity of the shipper, the destination address, the class of service, etc. In some cases, the shipper may decide after shipping the package that the destination address or class of service should be changed. When this occurs, the data associated with that package can be updated and the package can be intercepted and rerouted.

As mentioned earlier, before a package is loaded into an outbound ULD 8 at a hub, it is checked one last time to verify that it has been sorted correctly. In the preferred package delivery system, there are three primary ways that the package's disposition is verified. In some cases, the package identification data indicates the class of service that has been purchased for that package. If this is the case, the verification process checks to make sure that the class of service indicated by the package identification data corresponds to the class of service associated with the current sort. The data processing system also maintain exception tables, which indicate when some aspect of a package's service has been altered. For example, if the shipper calls and wants to reroute a package or upgrade the class of service, this data would be entered into an exception table. The third mechanism includes electronic data interchange (EDI) data, which is typically provided by large shippers. EDI data usually includes such information as the destination address and class of service. As described more completely below, these data are used by the preferred embodiment of the present invention in order to verify that the package has been property sorted and should be loaded into the ULD at that load position.

THE PREFERRED EMBODIMENT OF THE PRESENT INVENTION

Figure 2:
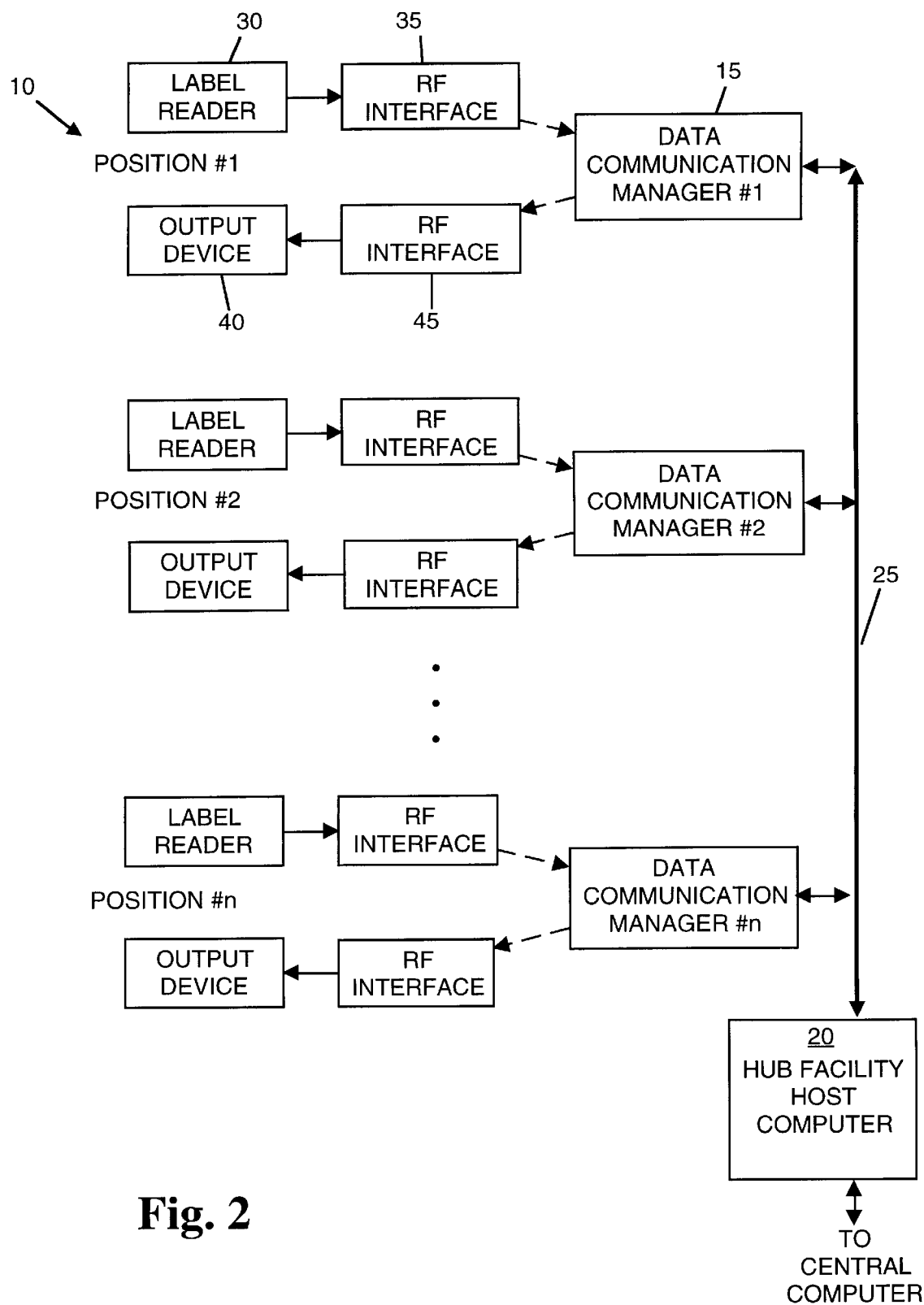
FIG. 2 is a block diagram of a system that embodies the present invention and processes data associated with a plurality of load positions.

FIG. 2 is a block diagram of a data processing system that employs the preferred embodiment of the present invention. The preferred system is installed at a hub, or central sorting facility, such as the one illustrated in FIG. 1. In general, objects, such as packages, that have been received by the package delivery company are transported to a hub, where they are sorted according to their destination. The sorted packages are conveyed to a load position 10 where they are loaded into outbound ULDs, such as trucks and air cargo containers, that are bound for that particular destination. The present invention is employed at each of the load positions, which is where the sorted packages are loaded into an outbound ULD.

Inasmuch as the same equipment is provided at each load position, the preferred embodiment will be described in conjunction with the equipment provided at load position #1. Each load position 10 includes a data communication manager 15, which is connected to the facility's host computer 20 via the hub's local area network 25. Those skilled in the art will appreciate that the data communication manager 15 may be connected to the host computer 20 in a variety of ways, including cable or a spread spectrum radio frequency link.

The host computer 20 is connected to the package delivery company's central computer system (not shown). As mentioned earlier, the central computer system is used for a variety of purposes, including package tracking and billing. In the context of the present invention, the key function of the central computer system is that it is used to maintain disposition data about the packages in the system. This disposition data may include original object parameters or shipping information that was acquired when the package was shipped, such as destination address, class of service, etc. The central computer also maintains updated disposition information called in by the shipper after the package was shipped. Updated information may include rerouting the package to a new address or upgrading the class of service.

The relevant information from the central host computer is periodically transferred to the hub's host computer 20, where it is used in conjunction with the present invention to ensure that package are properly sorted and loaded in the correct ULD. This process is described in more detail below in conjunction with FIGS. 4 and 5.

Referring to FIG. 2, the data communication manager 15 receives input data from a label reader 30, such as a bar code scanner. The input data includes package identification data, such as a tracking number, that uniquely identifies each package. The tracking number is typically provided in the form of a machine readable code such as a bar code. The label reader 30 is used to read the package identification information from the package immediately before it is loaded into a ULD. The label reader 30 is connected to a radio frequency (RF) interface 35 so that the data from the label reader may be transmitted to the data communication manager 15.

In the preferred system, the package identification data is embodied in a bar code symbol and the label reader 30 is an omnidirectional laser scanner, such as an Accusort Mini-X omnidirectional laser scanner. However, those skilled in art will appreciate that data communication manager 15 is designed to provide a device-independent interface for receiving input data from any of a variety of label readers. More particularly, the data communication manager 15 is able to receive input data from any label reader that can provide the required input data in an appropriate serial data format.

The data communication manager 15 uses the package identification information to determine whether the package should be loaded into the ULD that has been assigned to that load position. This is accomplished by comparing the package identification information to package disposition data that has been downloaded to the data communication manager 15 from the host computer 20. In this sense, the data communication manager provides two-way communications between the label reader and the host computer.

The data communication manager 15 provides a load/no-load signal to the loader at the load position by sending an output signal to an output device 40. In the preferred system, the output device is a vibrating pager that is worn by the loader. Although the output device may include a light or audible device or some sort, the pager reduces the amount of noise in the facility and eliminates the need to provide distinct tones or signals for each load position. The vibrating pager also eliminates the need for the loader to constantly be looking at a signal light. Regardless of the type of output device employed, it may be connected to data communication manager 15 via an RF interface 45. In the case of a pager, the RF interface is built into the pager unit. If the output device employs a light or other permanently mounted device, the output device may be connected via RF interface or by cabling of an appropriate type.

It will be appreciated that the use of RF links to transmit data to and from the data communication manager 15 greatly simplifies the process of connecting the equipment. This allows a label reader to be easily connected to the data communication manager regardless of whether the label reader is a portable handheld device carried by the user, or a stationary bar code scanner mounted adjacent the conveyor belt that is carrying the packages.

In the preferred system, the RF link used to connect the data communication manager 15 to the label reader 30 and output device 40 is an unregulated point-to-point RF link. Those skilled in the art will appreciate that the unregulated point-to-point radio is a low power technology that provides limited coverage. The unregulated point-to-point radio operates in the 902 to 928 MHz frequency range and provides multiple, switchable channels designed to transmit and receive signals between two points. The operating range of the unregulated point-to-point radio is generally in the range of 10–50 feet.

Unlike spread spectrum RF technology, unregulated point-to-point radio is tuned to a specific channel and will only communicate with a transceiver keyed to that particular frequency. This feature allows each data communication manager to receive signals from only one of the many label readers that are in use in the hub facility, analyze that data, and respond with a load/no-load signal to a particular load indicator. The use of the low power, point-to-point RF technology allows the data communication managers to be mounted approximately 12 feet from each other and tuned to the frequencies of the associated label reader and load/no-load output device. The preferred point-to-point RF modules interface with standard RS232 communication lines and can be connected to virtually any scanner or load/no-load indicator.

Figure 3:
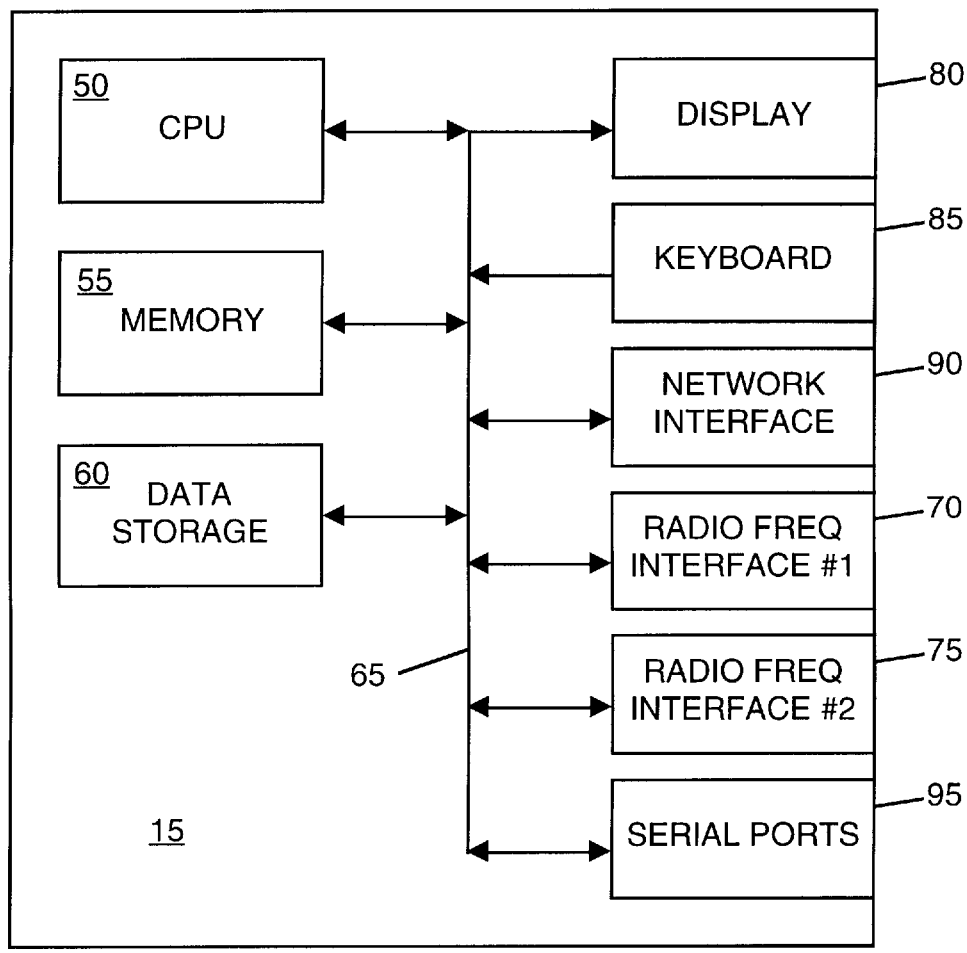
FIG. 3 is a block diagram of the preferred data communication manager, which forms part of the system of FIG.

FIG. 3 is a block diagram of the preferred data communication manager 15. As described above, the data communication manager 15 processes input data from the label reader in order to determine whether a package should be loaded in a particular ULD. In order to accomplish this task, the preferred data communication manager 15 includes a microprocessor 50, memory 55, a data storage device 60 and various input/output (I/O) devices. In the preferred data communication manager, the microprocessor 50 is a type 386 25 SX microprocessor manufactured by Intel Corporation. The microprocessor 50 is connected to the memory 55 via the system bus 65. The preferred memory includes 512 K bytes of static RAM and 1 megabyte of dynamic RAM. Those skilled in the art will appreciate that the microprocessor and memory may be chosen in accordance with amount of data that must be stored and processed and the response that is required. Depending on the amount of data that is stored and processed by the data communication manager, it may be desirable to also provide a relatively high capacity data storage device 60 such as a hard drive.

The data communication manager 15 includes a variety of I/O devices. The data communication manager communicates with the RF interface 35 associated with the label reader 30 (FIG. 1) via RF interface 70. Likewise, the data communication manager 15 communicates with the RF interface 45 associated with the output device 45 (FIG. 1) via RF interface 75.

The data communication manager also includes a display 80 for displaying instructions and information to the loader. The preferred display 80 is a 4 line by 80 character liquid crystal display. The data communication manager 15 includes a keyboard 85 that allows the loader to enter required data, which is described below in conjunction with FIGS. 3 and 4. Those skilled in the art will appreciate that the data communication manager also provide standard display and keyboard ports, which allow the data communication manager to be connected to various types of displays and keyboards, which may be selected to match the particular requirements of the particular system in which the data communication manager is used.

In the preferred system, the data communication manager 15 is connected to the host computer 20 (FIG. 1) via an ethernet-type LAN 25. The data communication manager is connected to the ethernet by means of a network interface 90. The data communication manager 15 also provides two serial ports connections 95, which may be used to connect the data communication manager to other input/output devices, such as a handheld secondary label reader or an RF converter for an RS-232 interface.

The preferred data communication manager 15 is designed to be expandable by adding various modules. The modules are integrated mechanically into the device and include electrical connections to the system bus 65. In this manner, a basic data communication manager may be upgraded to included additional memory 55, or the desired I/O modules, such as RF interfaces 70, 75, etc.

In order to increase the flexibility of the data communication manager 15 the application software that is executed by the data communication manager is downloaded from the host computer and stored in the data communication manager's memory 55. This allows the software in the data communication manager to be easily upgraded over the network, without requiring any changes to the data communication manager's hardware or firmware.

Figure 4:
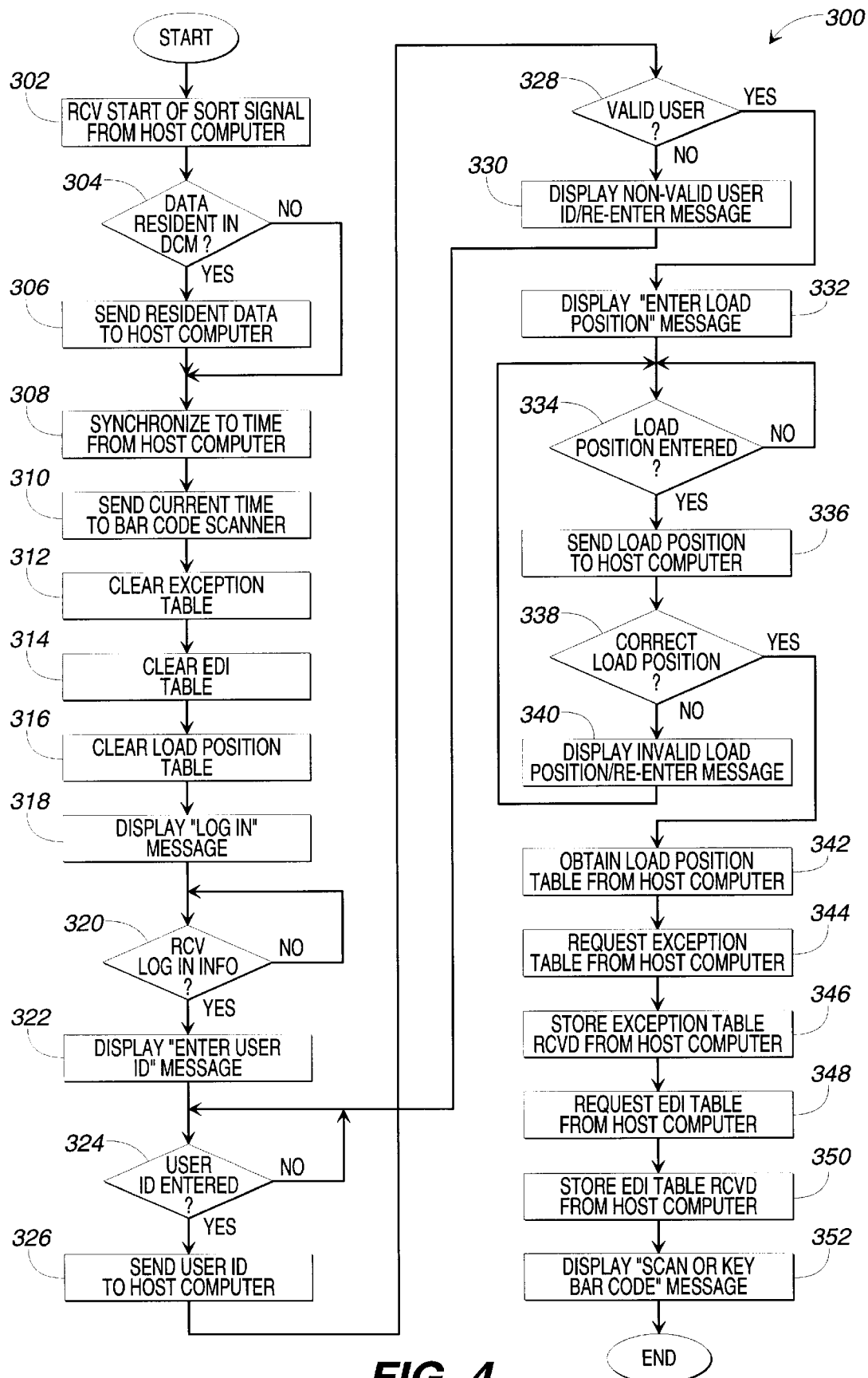
FIG. 4 is a flow diagram illustrating the preferred method for configuring the preferred data communication manager.
Figure 5A:
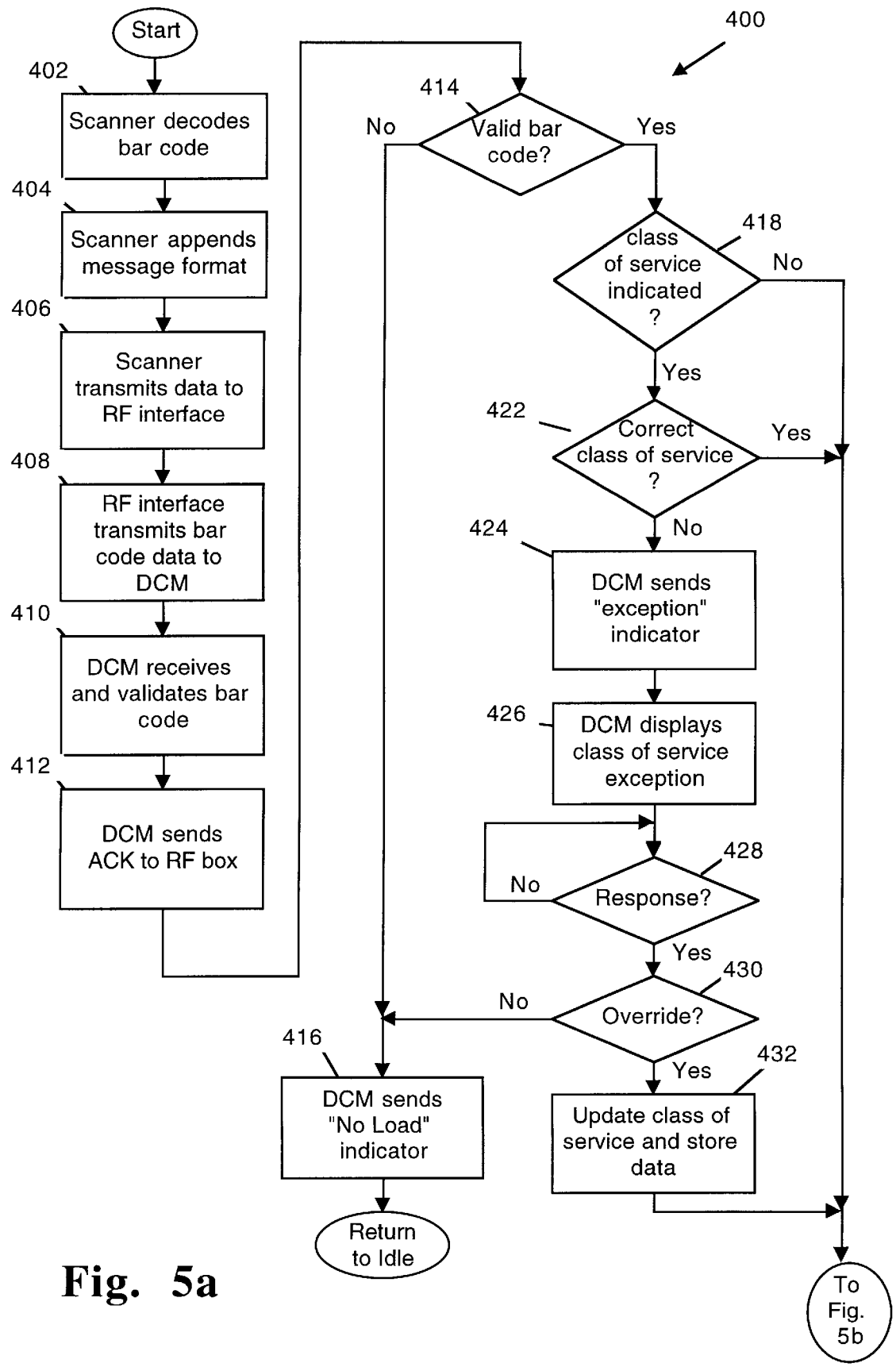
FIG. 5, which consists of FIGS. 5a–c is a flow diagram illustrating the preferred method of operation of each data communication manager and its associated input device.
Figure 5B:
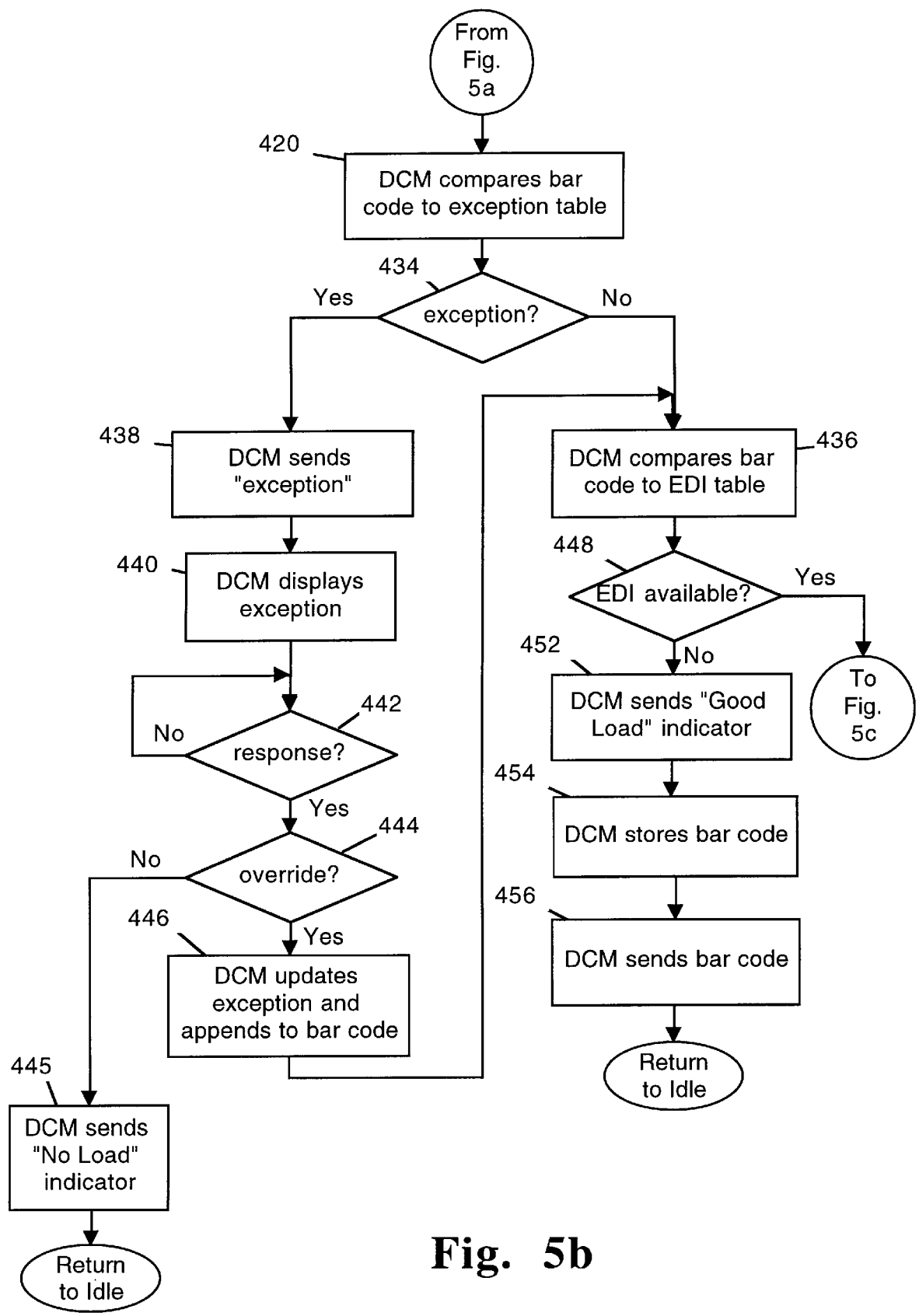

Turing now to FIGS. 4 and 5, the preferred method for operating the data communication manager will be described. FIG. 4 is a flow diagram illustrating the preferred method 300 for initializing the data communication manager. FIG. 5, which consists of FIGS. 5a–c, is a flow diagram of the preferred method 400 for processing data acquired by the label reader located at the load position.

Turning now to FIG. 4, the preferred method 300 illustrates the process by which a data communication manager is initialized and prepared to receive data from a label reader. Generally described, the method 300 is operative to clear data from previous sorts, download current package data resources from the host computer, and log in the current user.

The method 300 begins at step 305 when it receives a "start of sort" signal from the hub's host computer 20 (FIG. 1). This signal indicates that a new shift, or "sort," is about to begin. Because this takes place at the beginning of a new shift, all of the data communication managers in a hub facility are initialized at approximately the same time.

In response to the start of sort signal from the hub host computer, the data communication manager proceeds to step 304 and determines whether any data from the previous shift (or "sort") remains in the data communication manager's memory. If so, the data communication manager proceeds to step 306 and transfers the remaining data to the hub host computer. After the remaining data is transferred, or if no data is present at step 304, the data communication manager proceeds to step 308.

At step 308 the data communication manager synchronizes its internal clock to a time signal provided by the host computer. This is done because the data communication manager is used to track the movement of packages through the hub and it is important that all of the equipment operate using the proper time. At step 310 the data communication manager transmits the correct time to the label reader 30 (FIG. 1) via the low powered point-to-point RF link. Those skilled in the art will understand that this step ensures that those label readers that have internal clocks are synchronized to the time used by the data communications manager.

At step 312 the data communication manager resets its exception table. As explained below, the exception table includes disposition data regarding specific packages that are moving through the system. For example, the exception table could indicate that the shipper has called in and upgraded the type of service or asked that the package be rerouted to a new address. In such a case, these changes are provided to the hub's host computer by the central computer and included in an exception table, which is downloaded to the data communication manager. The exception data is indexed by the package identification information or tracking number that appears on the label affixed to the package. Generally described, when the data communication manager receives package identification information from the label reader, it checks to see if the package tracking number matches one of the tracking numbers in the exception table. If not, the method assumes that there are no changes to service associated with the package. The response to an exception is discussed below.

After the exception table is cleared, the data communication manager proceeds to step 314 and resets its electronic data interchange (EDI) table. The purpose of the EDI table is similar to the exception table in that it includes package specific disposition data that is indexed by tracking number. However, the EDI data is provided by the shipper and typically includes the destination address, level of service, etc. The data communication manager uses the EDI table to confirm that the package is on its way to the proper destination.

After the old EDI table is cleared, the data communication manager proceeds to step 316 and resets its load position table. The load position table indicates the position parameters, namely destination addresses, that are serviced by the load position associated with that particular data communication manager. Unlike the exception table and EDI table, the load position table is not indexed by package tracking number. Instead, the load position table indicates the ZIP codes that are serviced by that load position.

After the load position table is cleared, the data communication manager proceeds to step 318 and displays a log in message on its display 80 (FIG. 2). This message prompts the loader at the associated load position to enter his or her name using the keyboard 85 (FIG. 2).

At step 320 the data communication manager determines whether it has received a response to the log in message. If the data communication manager has not received a log in response via the keyboard 85 (FIG. 2) it loops back and continues to check for a response.

Once a response is received the data communication manager proceeds to step 322 and displays an "enter user ID" message, which prompts the loader to enter his or her employee number. At step 324 the data communication manager determines whether it has received a response via the keyboard, it loops back and continues to check for a response.

Once a user ID is entered via the keyboard, the data communication manager proceeds to step 326 and transmits the user ID data to the hub's host computer 20 (FIG. 1). At step 328 the data communication manager determines whether the host computer has indicated that the user ID is valid and that the loader is working at the proper load position. If not, the data communication manager proceeds to step 330 and displays a message indicating that the user ID was invalid. The user is then prompted to re-enter his or her user ID. At that point, the data communication manager returns to step 324.

If, at step 328 the host computer has indicated that the loader is a valid user, the data communication manager goes to step 332 and displays a message prompting the loader to enter the load position. At step 334 the data communication manager determines whether a response has been entered via the keyboard. If not, the data communication manager loops back continues to check for a response. When a response is received, the data communication manager transmits the entered load position data to the hub's host computer.

At step 338 the data communication manager determines whether the host computer has responded by indicating that the load position is correct. If not, the data communication manager goes to step 340 where it displays a message indicating that the load position is invalid. The data communication manager prompts the loader to re-enter the load position and returns to step 334.

If the load position is confirmed by the host computer at step 338 the data communication manager proceeds to step 342 and obtains the load position table for the associated load position. The load position table is provided by the host computer and indicates which destination zip codes will be loaded into the ULD at that position. The data communication manager stores the load position table in an appropriate memory storage device, such as the data communications manager's RAM or hard drive.

At step 344 the data communication manager requests the current exception table from the host computer. As discussed above, the exception table includes package disposition data that is derived from data provided by the central computer and indicates specific packages that need to be intercepted for some reason. Those skilled in the art will appreciate that the data provided to each data communications manager is "sort dependent." In other words, each data communications manager only receives data that is relevant to the packages that are expected to be sorted and loaded during the upcoming sort or shift. This ensures that each data communication manager is required to store and process only a manageable amount of disposition data.

At step 346 the data communication manager receives the current exception table from the host computer and stores it in an appropriate memory storage device, such as the data communications manager's RAM or hard drive.

At step 348 the data communication manager requests the current EDI table from the host computer. As discussed above, the EDI table include package disposition data that is derived from data provided by the central computer and indicates a variety of information about a large percentage of packages in the system. Like the exception data loaded at step 344, the EDI data provided to the data communication manager is sort dependent so that each data communication manager receives only a manageable amount of disposition data.

At step 350 the data communication manager receives the current EDI table from the host computer and stores it in an appropriate memory storage device.

At step 352 the data communication manager has received all of the required data and is ready to begin the new sort. At that point, the data communication manager enters an idle state and displays a message instructing the loader to scan a package or key in a bar code.

Although the exception and EDI tables are preferably downloaded to the data communication manager at the beginning of the sort, the constant connection between the data communication manager and the host computer makes it possible for the host computer to update the exception and EDI data at any time during the sort. In the preferred system, the host computer may send a proclamation, which is similar to an all points bulletin, if there is new exception data associated with a particular package that needs to be intercepted during the current sort.

Turning now to FIG. 5, the preferred method for operating the data communication manager 15 during a sort will be described. The flow diagram of FIG. 5 includes FIGS. 5a–c.

The flow diagram primarily illustrates the steps carried out by the data communication manager, but also indicates certain steps performed by the label reader 30 (FIG. 1).

Before describing each step in detail, it is helpful to discuss the general flow of the method of FIG. 5. The primary goal of the method 400 is to ensure that each package has been properly sorted and to verify that it belongs at the load position (and in the ULD) associated with the data communication manager. This is accomplished in several steps. If the package passes each step, it is loaded into the ULD. Initially, the data communication manager determines that the bar code is valid and that it indicates the correct class of service. For example, next day packages are all shipped and sorted together and will be identified by bar codes that indicate the class of service as a next day package. If the class of service appears to be correct, the data communication manager then checks the package identification data against the current exception table to determine whether the package needs to be intercepted for some reason, such as a change of destination or class of service. If there is no match in the exception table, the data communication manager checks the data in the EDI table, which includes shipping data provided by the shipper. This would typically confirm that the package is on its way to the proper destination based on the shipping data reported by the shipper and not just based on the address printed on the package. Finally, the data communication manager determines that the package destination matches the load position table. If any of these tests indicate that the package may not belong in the associated ULD, the data communication manager provides a signal to the loader. The loader may override the data communication manager's objection or simply pass the package to a package service clerk. In either case, the package's fate is recorded by the data communication manager and forwarded to the host computer.

Referring now to FIG. 5a, the method 400 begins at step 402 when the label reader 30 (FIG. 1) scans a bar code on a package at the load position. The preferred label reader decodes the bar code symbols and derives the ASCII data corresponding to the encoded characters.

At step 404 the label reader forms a message packet by appending formatting information to the decoded ASCII characters. In the preferred system, the appended information includes a header and a block check character, which is similar to a check sum and provides a mechanism for verifying that the data is correctly received from the label reader. At step 406 the label decoder transmits the message packet to the RF interface 35 (FIG. 1), which transmits the message packet to the data communication manager (step 408). As described above, the message packet is transmitted from the RF interface to the data communication manager via a preselected channel in the low powered point-to-point radio system.

At step 410 the data communication manager receives the message packet and validates the constituent data. In the preferred system, the validation step includes determining that the bar code belongs to the package delivery company. This is accomplished by checking for certain data elements included in the bar code. In the preferred system, the assignee of the present invention employs a series of modified check digits and unique data identifiers and characters to indicate that the bar code belongs to that package delivery company.

At step 412 the data communication manager sends an acknowledgment message back to the label reader, which communicates with the data communication manager using an ack/nack protocol. If the label reader does not receive an ack from the data communication manager, it will attempt to resend the data for predetermined number of retries or until a predetermined period of time has elapsed.

At step 414 the data communication manager determines whether, on the basis of the validation at step 410, the bar code is a valid bar code. If the bar code is not valid or does not belong to the package delivery company, the data communication manager proceeds to step 416 and transmits a "no load" indicator to the output device 40 (FIG. 1). The loader at the load position responds to the no load indicator by rerouting the package to a package service clerk instead of loading it into the ULD. From there, the data communication manager returns to the idle state and waits for another bar code to be scanned.

If, at step 414, the data communication manager determines that the bar code is a valid bar code, the data communication manager proceeds to step 418 and determines whether the bar code symbol indicates the class of service for that package. In the preferred system, the bar code symbols used in conjunction with certain types of service indicate the class of service. If the bar code symbol does not indicate the class of service, the data communication manager goes to step 420 where it begins the process of checking the exception, EDI and load positions tables.

If the bar code symbol indicates the class of service, the data communication manager goes to step 422 and determines whether the class of service is correct. As mentioned above, each sort includes only packages with a predetermined class of service. Therefore, if the sort is for next day packages and the bar code indicates that the package is a next day package, the data communication manager will determine that the class of service is correct and proceed to step 420 where it begins the process of checking the exception, EDI and load positions tables.

If the class is incorrect, the data communication manager proceeds to step 424 and sends an "exception" signal to the output device 40 (FIG. 1), which indicates to the loader that there is a potential problem with that package. At step 426 the data communication manager displays on the display 80 (FIG. 2) a message indicating that the package has the wrong class of service.

At step 428 the data communication manager determines whether the loader has responded to the exception message via the keyboard 85 (FIG. 1). If not, the data communication manager loops back to step 428 and waits for a response from the loader. When the data communication manager detects a response from the loader, the data communication manager goes to step 430 and determines whether the loader has decided to override the class of service exception. In this manner, the data communication manager is designed to defer to the judgment of the loader who may be able to conclusively determine that the package belongs in that ULD.

If, at step 430, the input is not an override indication, the data communication manager goes to step 416 and transmits a "no load" indicator to the output device 40 (FIG. 1). The loader at the load position responds to the no load indicator by rerouting the package to a package service clerk instead of loading it into the ULD. From there, the data communication manager returns to the idle state and waits for another bar code to be scanned.

If, at step 430, the input is an override indication, the data communication manager goes to step 432 and updates the class of service data associated with that package. This updated package data is stored in the data communication manager for subsequent transmission to the hub's host computer.

Beginning at step 420, which appears on FIG. 5b, the data communication manager begins the portion of the method 400 that checks the exception, EDI, and load position tables. At step 420 the data communication manager compares the current package's tracking number, which is indicated by the bar code, to the tracking numbers in the exception table. At step 434, if the tracking number does not appear in the exception table, the data communication manager proceeds to step 436.

If the package's tracking number matches a tracking number in the exception table, the data communication manager goes to step 438 and sends an "exception" signal to the output device 40 (FIG. 1), which indicates to the loader that there is a potential problem with that package. At step 440 the data communication manager displays on the display 80 (FIG. 2) a message indicating that the particular exception that appears in the exception table. In the preferred system, typical exceptions include changes in the package's destination address and changes in class of service.

At step 442 the data communication manager determines whether the loader has responded to the exception message via the keyboard 85 (FIG. 1). If not, the data communication manager loops back to step 442 and waits for a response from the loader. When the data communication manager detects a response from the loader, the data communication manager goes to step 444 and determines whether the loader has decided to override the displayed exception. In this manner, the data communication manager is designed to defer to the judgment of the loader who may be able to conclusively determine that the package belongs in that ULD.

If, at step 444, the input is not an override indication, the data communication manager goes to step 445 and transmits a "no load" indicator to the output device 40 (FIG. 1). The loader at the load position responds to the no load indicator by rerouting the package to a package service clerk instead of loading it into the ULD. From step 445 the data communication manager returns to the idle state and waits for another bar code to be scanned.

If, at step 444, the input is an override indication, the data communication manager goes to step 446 and updates the exception data associated with that package. This updated package data is stored in the data communication manager for subsequent transmission to the hub's host computer. From step 446 the data communication manager proceeds to step 436.

At step 436 the data communication manager compares the package's tracking number to tracking numbers that appear in the EDI table. As mentioned above, the EDI table includes package disposition information that is provided by some shippers. This information typically includes destination address, class of service, etc. The data communication manager uses the EDI table to ensure that the service being provided to the package is consistent with the service originally intended by the shipper.

At step 448 the data communication manager determines whether the tracking numbers matches a tracking number in the EDI table. If so, this indicates that EDI information is available for that package and the data communication manager proceeds to step 450. If not, the data communication manager goes to step 452.

At step 452 the data communication manager sends a "good load" indicator to the output device 40 (FIG. 1), which indicates to the loader that the package should be loaded in the current ULD. At step 454 the data communication manager stores the tracking number of the current package in order to record that the package was loaded into the current ULD. At step 456 the data communication manager also transmits the tracking number to the hub's host computer. As mentioned above, these steps provide redundant data storage, both at the data communication manager and at the host computer. However, as also mentioned above, because the data is stored in the data communication manager, the system is capable of continuing to operate even if the connection to the host computer is temporarily broken.

Beginning at step 450, which appears on FIG. 5c, the data communication manager begins the portion of the method 400 that compares the available EDI data to the load position table. At step 450 the data communication manager compares the destination address from the EDI table to the data in the load position table. As explained above, the load position table indicates which destination addresses are serviced by the ULD associated with the data communication manager. In other words, the EDI data indicates where the package was originally supposed to go, and the load position table indicates where the ULD is supposed to go. At step 458 the data communication manager determines whether the load position is correct, i.e., the ULD and package are both supposed to go to the same destination. If so, the data communication manager goes to step 460.

If at step 458 the data communication manager determines that the load position does not match the EDI data, the data communication manager goes to step 462, where it sends an "exception" signal to the output device 40 (FIG. 1), which indicates to the loader that there is a potential problem with that package. At step 464 the data communication manager displays on the display 80 (FIG. 2) a message indicating that there is a possible load position error.

At step 466 the data communication manager determines whether the loader has responded to the exception message via the keyboard 85 (FIG. 1). If not, the data communication manager loops back to step 466 and waits for a response from the loader. When the data communication manager detects a response from the loader, the data communication manager goes to step 468 and determines whether the loader has decided to override the load position error exception. In this manner, the data communication manager is designed to defer to the judgment of the loader who may be able to conclusively determine that the package belongs in that ULD.

If, at step 468, the input is not an override indication, the data communication manager goes to step 470 and transmits a "no load" indicator to the output device 40 (FIG. 1). The loader at the load position responds to the no load indicator by rerouting the package to a package service clerk instead of loading it into the ULD. From there, the data communication manager returns to the idle state and waits for another bar code to be scanned.

If, at step 468, the input is an override indication, the data communication manager goes to step 472 and updates the load position data associated with that package. This updated package data is stored in the data communication manager for subsequent transmission to the hub's host computer. From step 472 the data communication manager proceeds to step 460.

At step 460 the data communication manager sends a "good load" indicator to the output device 40 (FIG. 1), which indicates to the loader that the package should be loaded in the current ULD. At step 474 the data communication manager stores the tracking number of the current package in order to record that the package was loaded into the current ULD. At step 476 the data communication manager also transmits the tracking number to the hub's host computer. As mentioned above, these steps provide redundant data storage, both at the data communication manager and at the host computer. However, as also mentioned above, because the data is stored in the data communication manager, the system is capable of continuing to operate even if the connection to the host computer is temporarily broken.

From step 476 the data communication manager returns to the idle state and waits for another bar code to be scanned.

From the foregoing description, it will be appreciated that the present invention provides a versatile interface between different types of label readers and a central computer system. Each data manager periodically receives loading data from the host computer. The label readers are used to read package identification data from labels on packages at various points in a hub facility. When a loader uses a scanner to read a bar code, the package identification data is transmitted from the label readers to the data communication manager via radio frequency (RF) link. The data manager uses stored data (received from the host earlier) to determine whether the package should be loaded and transmits the appropriate signal to the load/no-load indicator via another RF link. The data manager stores the package data in its memory and also forwards the data to the host computer, where it is used for tracking purposes.

Furthermore, by providing a "smart" data manager, the system reduces the amount of traffic on the host computer's network and provides sub-second response times to the loader. In addition, the application programs and data in the data managers may be updated by the host as needed. The host may also send a proclamation (like an all points bulletin) to each data manager at any time during a sort if there is a specific package that should not be loaded, etc.

Those skilled in the art will also appreciate that the use of unregulated, low power RF links allows tens or hundreds of these units to be used in a terminal facility. The RF units avoid the need for expensive cables, and are much less expensive than other RF technology.

The foregoing methods of the present invention may conveniently be implemented in a program module that is based upon the flow charts of FIGS. 4 and 5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described as using a bar code scanner to scan and decode a bar code, the present invention is suitable for use with a CCD based imaging system that reads two-dimensional dense codes. Similarly, although bar codes are used to provide an index into data tables that contain disposition data, dense codes may provide the disposition data itself, which may be verified by the data communication manager. Although the present invention is described in the context of a package delivery system, the present invention is suitable for use in any system in which a plurality of input devices are used to provide input data that is considered in conjunction with data provided by a central host computer.

Alternative embodiments will become apparent to those skilled in the art to which the present invention pertains without departing from its spirit and scope. Accordingly, the scope of the present invention is defined by the appended claims rather than the foregoing description.

What is claimed is:

1. A distributed system for providing a load/no-load signal for items that have been sorted and conveyed to a plurality of positions in a sorting facility, comprising:

a data communication manager associated with each of said positions;

an input device associated with each of said positions and operative to provide identification data from said items to said corresponding data communication manager; and an output device associated with each of said positions and operative to receive a load/no-load signal from said corresponding data communication manager;

wherein each of said data communication managers is operative to:

store disposition data received from a host computer;

receive from said corresponding input device identification data identifying an item that has been sorted and conveyed to the position associated with said corresponding input device;

determine, based on said identification data and said stored disposition data, whether said item should be loaded into a unit load device for receiving items conveyed to said associated position; and provide a load/no-load signal to said corresponding output device, said a load/no-load signal indicating whether said item should be loaded into said unit load device.

2. The system of claim 1, wherein said disposition data comprises data indicative of a destination for a unit load device for receiving items conveyed to said associated position.

3. The system of claim 1, wherein said disposition data comprises data indicative of the destination of said item.

4. The system of claim 1, wherein said disposition data comprises data indicative of a class of service associated with said associated position and said identification data comprises data indicative of a class of service associated with said item.

5. The system of claim 1, wherein determining whether said item should be loaded into said unit load device comprises determining whether a characteristic associated with said item matches a characteristic associated with said associated position.

6. The system of claim 5, wherein said characteristic comprises a destination.

7. The system of claim 5, wherein said characteristic comprises a class of service.

8. The system of claim 1, wherein determining whether said item should be loaded into said unit load device comprises determining whether said disposition data indicates that an object parameter originally associated with said item has been altered.

9. The system of claim 8, wherein said object parameter comprises a destination address.

10. The system of claim 1, wherein said disposition data is transferred from said host computer to said data communication managers at predetermined times and when updated disposition information is available at said host computer.

11. The system of claim 1, wherein said input device is a code reader for reading machine readable codes affixed to said items.

12. The system of claim 1, wherein said data communication manager is further operative to:
store data indicative of the disposition of said item; and
forward said stored data to said host computer.

13. The system of claim 1, wherein said output device comprises a pager.

14. The system of claim 1, wherein said output device comprises a light.

15. The system of claim 1, wherein said input device is connected to said data communication manger via an RF link.

16. The system of claim 1, wherein said output device is connected to said data communication manger via an RF link.

17. In a system for sorting a plurality of objects and conveying each of said sorted objects to a predetermined one of a plurality of positions, the improvement comprising:
a host computer comprising disposition data associated with at least one of said sorted objects;
a plurality of data communication managers operatively connected to said host computer, one of said data communication managers being associated with each of said positions; and
a plurality of input devices for reading object identification data from said sorted objects, one of said input devices being operatively connected to each of said data communication managers;
said host computer being operative to transfer said disposition data to said data communication managers;
said input devices being operative to read said object identification data from said sorted objects and transmit said object identification data to said connected data communication manager;
said data communication managers being operative to:
store said disposition data;
determine, based on said stored disposition data and said object identification data, whether said sorted object should be loaded into a unit load device for receiving items conveyed to said associated position;
provide a load/no-load signal indicative of whether the sorted object should be loaded into said unit load device; and
transmit to said host computer data indicative of the disposition of said sorted object.

18. The improvement of claim 17, wherein said disposition data comprises data indicative of a destination for a unit load device associated with each of said plurality of positions.

19. The improvement of claim 17, wherein said disposition data comprises data indicative of the destination of said sorted object.

20. The improvement of claim 17, wherein said plurality of input devices comprise code readers for reading machine readable codes affixed to said sorted objects.

21. The improvement of claim 17, wherein determining whether said sorted object should be loaded into said unit load device comprises determining whether a characteristic associated with said sorted object matches a characteristic associated with said associated position.

22. The improvement of claim 17, wherein determining whether said sorted object should be loaded into said unit load device comprises determining whether said stored disposition data indicates that an object parameter originally associated with said sorted object has been altered.

23. The improvement of claim 22, wherein said object parameter comprises a destination address.

24. The improvement of claim 22, wherein said object parameter comprises a class of service.

25. A plurality of load verification devices for use in a facility for sorting packages and conveying sorted packages to a plurality of load positions, each of said plurality of load verification devices being associated with one of said load positions for providing a load/no-load signal to a loader at said load position, each of said load verification devices comprising:
a data communication manager, said data communication manager being capable of exchanging data with a host computer associated with said facility;
an input device for reading identification data from a sorted package and providing said identification data to said data communication manager; and
an output device for providing a load/no-load signal to said loader, said load/no-load signal being generated by said data communication manager;
wherein said data communication manager is initialized by performing the steps of:
receiving from said host computer a signal indicating the beginning of a sort;
receiving from said host computer a load position table indicating the destination of a unit load device associated with said load position;
storing said load position table;
receiving from said host computer an exception table indicating the identity of packages that are to be intercepted at their respective load positions;
storing said exception table;
receive from said host computer destination data associated with at least one of said sorted packages, said destination data indicating the destination of said associated package;
storing said destination data;
wherein said data communication manager provides a load/no-load signal by performing the steps of:
receiving from said input device identification data associated with a sorted package;
determining whether said received identification data corresponds to data in said stored exception table;
in response to said received identification data corresponding to data in said stored exception table, sending a no-load signal to said output device;
determining whether said receiving identification data corresponds to data in said stored destination data;
in response to said received identification data corresponding to data in said stored destination data, determining whether the destination of said unit load device corresponds to the destination of said package;
in response to the destination of said unit load device not corresponding to the destination of said package, sending a no-load signal to said output device;
otherwise, sending a load signal to said output device.

26. The load verification devices of claim 25, wherein said data communication manager is initialized by performing the additional step of synchronizing an internal clock to a time signal provided by said host computer.

27. The load verification devices of claim 25, wherein said data communication manager is initialized by performing the additional steps of:

determining, in response to receipt of said sort signal, whether package data from a previous sort is resident in said data communication manager; and in response to package data from a previous sort being resident in said data communication manager, transmitting said package data to said host computer.

28. The load verification devices of claim 25, wherein said data communication manager provides a load/no-load signal by performing the additional steps of:

determining whether the identification data is valid; and if said identification data is not valid, sending a no-load signal to the output device.

29. The load verification devices of claim 25, wherein said data communication manager provides a load/no-load signal by performing the additional steps of:

determining whether a class of service associated with the sorted package corresponds to a class of service associated with the load position; and p1 if said class of service associated with the sorted package does not correspond to said class of service associated with the load position, sending a no-load signal to said output device.

30. The load verification device of claim 29, wherein said data communication manager provides a load/no-load signal by performing the additional steps of:

receiving an override signal from said loader; and storing package data indicating that the disposition of said sorted package was determined by said loader.

31. The load verification device of claim 25, wherein said data communication manager provides a load/no-load signal by performing the additional steps of:

receiving, in response to a no-load signal, an override signal from said loader; and storing package data indicating that the disposition of said sorted package was determined by said loader.

32. The load verification device of claim 25, wherein said data communication manager provides a load/no-load signal by performing the additional steps of:

storing package data indicative of the disposition of said sorted package; and transmitting said package data to said host computer.

33. The load verification device of claim 25, wherein said input device is a code reader for reading a machine readable code affixed to said sorted package.

* * * * *

UNITED STATES PATENT AND TRADEMARK OFFICE
CERTIFICATE OF CORRECTION

PATENT NO.    : 5,804,802

DATED         : September 8, 1998

INVENTOR(S)   : Jennifer M. Card and
                Ken Liberatore

It is certified that error appears in the above-identified patent and that said Letters Patent is hereby corrected as shown below:

In column 21, line 18, claim 29, please delete [p1]

Signed and Sealed this

Twenty-third Day of March, 1999

Attest:

Q. TODD DICKINSON

Attesting Officer          Acting Commissioner of Patents and Trademarks